No. 646,253. Patented Mar. 27, 1900.
A. W. BANISTER.
DUST COLLECTOR AND SEPARATOR.
(Application filed Aug. 30, 1899.)
(No Model.)
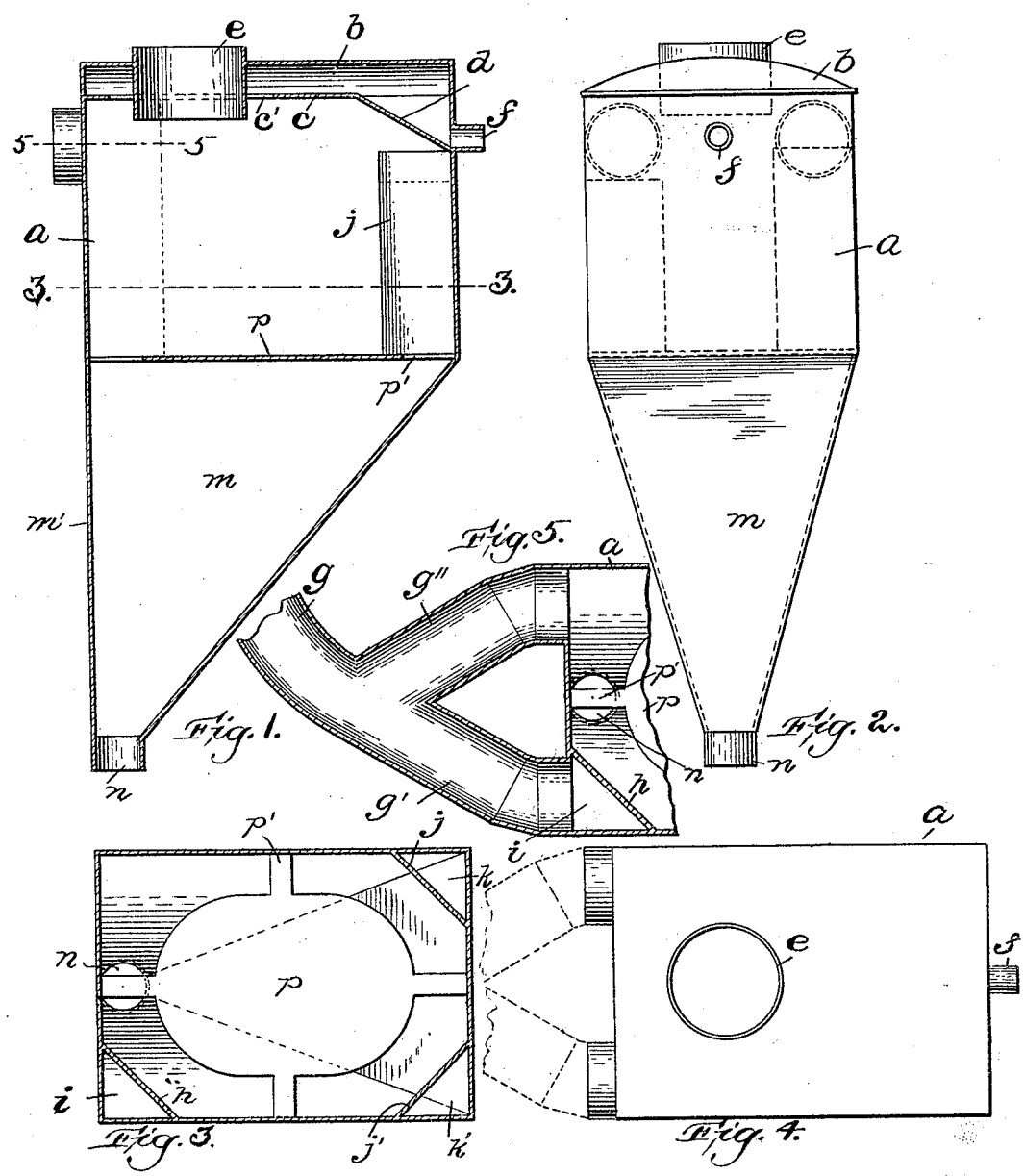
Witnesses:
Roy K. Hill.
Annie J. Dailey
Inventor
Arthur W. Banister
by Crossley & Davis,
Attorneys

UNITED STATES PATENT OFFICE.

ARTHUR W. BANISTER, OF BOSTON, MASSACHUSETTS.

DUST COLLECTOR AND SEPARATOR.

SPECIFICATION forming part of Letters Patent No. 646,253, dated March 27, 1900.

Application filed August 30, 1899. Serial No. 728,927. (No model.)

*To all whom it may concern:*

Be it known that I, ARTHUR W. BANISTER, of Boston, in the county of Suffolk and State of Massachusetts, have invented certain new and useful Improvements in Dust Collectors and Separators, of which the following is a description sufficiently full, clear, and exact to enable those skilled in the art to which it appertains or with which it is most nearly connected to make and use the same.

The present invention relates to the type of dust collecting and separating apparatus illustrated and described in Patent No. 600,300, granted to me March 8, 1898; and the prime object in the present case is to provide for separation and disposition of the dust and other matter to be recovered in such a way as to insure against choking of the outlet, which is necessarily more or less contracted. The separation and recovery of the products are effected by a system of deflection, the current of dust-laden air and other matter entering the separator laterally and impinging against a downward deflector and also encountering lateral deflectors, in association with which and with the downward deflector means in the nature of flues are employed to catch the flying particles and conduct the same to a common outlet. Provision is also made for direct discharge of the first-separated matter without reaching the deflectors.

With the above-stated object in view the invention consists in certain novel features of construction and combinations of parts, the essential elements of which are recited in the appended claims, and a preferred form of embodiment of which is illustrated in the accompanying drawings and specifically described hereinafter.

Of said drawings, Figure 1 represents the apparatus in vertical longitudinal section. Fig. 2 represents the same in end elevation. Fig. 3 is a horizontal section taken on line 3 3 of Fig. 1. Fig. 4 is a top plan view, and Fig. 5 is a fragmentary horizontal section on line 5 5 of Fig. 1.

The exterior casing of the separator, as shown in the drawings, comprises an upper rectangular portion $a$, in the top part of which a chamber $b$ is formed by a horizontal partition-plate $c$ and a downwardly-inclined deflector-plate $d$, joining the back and sides of the casing. An outlet for dust-free air is provided in the top of the casing by a flue $e$, which extends down through the partition-plate $c$, the latter having an opening $c'$ sufficiently large to form a passage-way around the flue, establishing communication between the chamber $b$ and the interior of the casing, with the purpose of admitting fine particles of dust to said chamber. An outlet from the latter is provided at the back, where a nipple $f$ projects from the casing, just above the lower line of the deflector-plate $d$, to discharge into the atmosphere dust so fine as to be almost imperceptible.

The current of dust-laden air, impelled by a fan or otherwise, approaches the apparatus by a bent pipe $g$, from which divergent branches $g'$ and $g''$, lead to the casing, at the upper corners of the same, below the partition-plate $c$, the bend of the pipe $g$ causing a considerable portion of the large particles to pass along the branch $g'$, although the current divides at the juncture of the branches, part passing through the branch $g''$. A vertical plate $h$ extends across an interior corner of the main chamber of the rectangular portion of the casing, from top to bottom thereof, and the branch pipe $g'$ opens directly into the flue $i$, formed by said plate, so that the flying particles carried through the said branch pipe will fall immediately through said flue. Across the corners at the opposite side of the casing other vertical plates $j$ and $j'$ extend, these plates serving the double purpose of lateral deflectors and walls of vertical flues $k$ and $k'$, opening at their upper ends just below the deflector $d$. The plate $j$ extends to a greater height than the plate $j'$, the current carrying the particles at higher velocity when passing the former and many, but not all, of the flying particles being caught in the flue $k$, by which they are passed directly downward. Other particles not caught in the flue $k$ and flying below the upper open end thereof will be caught in the flue $k'$, by which they are passed downward. All three of the flues $k$, $k'$, and $i$ open at their lower ends into a hopper-like lower portion or appendage $m$ of the casing, one wall $m'$ of which appendage is vertical, while the other three walls converge at such an angle as to insure the sliding down of particles dropping from the flues or otherwise falling onto the sides of the hopper. The straight side $m'$ provides for the direct downward fall of the first separated matter coming through the flue $i$. The hopper terminates at the lower end in a contracted outlet $n$, and all the separated matter is discharged through the same except the imperceptible dust collected in the chamber $b$.

A horizontal plate $p$ may be secured within the casing, between the main chamber of the rectangular part thereof and the top of the hopper, said plate being connected with the sides of the casing by arms $p'$ and serving to prevent an upward current or the return of matter from the hopper, while at the same time giving ample space for downward passage of materials to be recovered.

Sufficient statements of operation have been coupled with the description of the construction of the apparatus here shown to make unnecessary any further explanation as to the mode of operation.

It will be seen that the particles are collected at different stages of the movement of the current, so that they will be divided into different groups or charges, passing successively to the final outlet, thereby avoiding any choking of the latter.

It is to be understood that the invention herein disclosed may be embodied otherwise than as shown in the drawings and specification, and hence the appended claims are not limited to any one particular form of construction.

Having thus explained the nature of the invention and described a way of constructing and using the same, though without attempting to set forth all of the forms in which it may be made or all of the modes of its use, it is declared that what is claimed is—

1. A dust collector and separator comprising in its construction a casing having a plurality of divergent lateral inlets for the dust-laden current, a vertical flue with which one of said inlets is in direct communication, said flue opening at its lower end within the casing, one or more deflectors opposite the other inlet, a downward outlet from the casing for separated matter from both inlets, and a top air-outlet.

2. A dust collector and separator comprising a casing having a lateral inlet for dust-laden air and provisions for diverting the incoming current downwardly and laterally, together with open-top vertical flues to catch separated matter, a downward outlet for the latter from the casing, and a top air-outlet.

3. A dust collector and separator comprising a casing having a lateral inlet for dust-laden air, a downward deflector opposite said inlet, a lateral deflector forming an open-top vertical flue below said downward deflector to catch matter diverted thereby, a downward outlet from the casing for separated matter, and a top outlet for dust-free air.

4. A dust collector and separator comprising a casing having a lateral inlet for dust-laden air, a downward deflector opposite said inlet, lateral deflectors forming open-top flues of different heights below the said downward deflector to catch matter diverted thereby, a downward outlet from the casing for separated matter, and a top air-outlet.

5. A dust collector and separator comprising in its construction a casing having a plurality of divergent lateral inlets for the dust-laden current, a vertical flue with which one of said inlets is in direct communication, said flue opening at its lower end into the casing, a downward deflector opposite the other inlet, one or more lateral deflectors forming open-top vertical flues below the downward deflector to catch matter diverted thereby, a downward outlet from the casing common to the different flues, and a top outlet for dust-free air.

In testimony whereof I have signed my name to this specification, in the presence of two subscribing witnesses, this 28th day of August, A. D. 1899.

ARTHUR W. BANISTER.

Witnesses:
ARTHUR W. CROSSLEY,
F. P. DAVIS.